US012719342B2

(12) United States Patent
Yonemori

(10) Patent No.: US 12,719,342 B2
(45) Date of Patent: Aug. 25, 2026

(54) VEHICLE DRIVING MOTOR HAVING SECONDARY CONDUCTORS FOR MAGNETIC FLUX GUIDANCE

(71) Applicant: Mazda Motor Corporation, Hiroshima (JP)

(72) Inventor: Kei Yonemori, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 192 days.

(21) Appl. No.: 18/655,342

(22) Filed: May 6, 2024

(65) Prior Publication Data

US 2024/0388184 A1 Nov. 21, 2024

(30) Foreign Application Priority Data

May 15, 2023 (JP) ................................ 2023-080423

(51) Int. Cl.
*H02K 21/46* (2006.01)

(52) U.S. Cl.
CPC .................................... *H02K 21/46* (2013.01)

(58) Field of Classification Search
CPC ........ H02K 21/46; H02K 21/00; H02K 1/265; H02K 1/26; H02K 1/22; H02K 1/2706; H02K 1/27; H02K 1/276; H02K 17/16; H02K 17/26; H02K 17/18; H02K 1/223
See application file for complete search history.

(56) References Cited

U.S. PATENT DOCUMENTS 4,139,790 A * 2/1979 Steen ...................... H02K 21/46 310/212
5,917,248 A * 6/1999 Seguchi .................... B60K 6/26 903/952
2006/0131980 A1 6/2006 Weihrauch et al.
2018/0212502 A1* 7/2018 Finkle ..................... H02K 21/46
2020/0251942 A1* 8/2020 Ueda ......................... H02K 5/16

FOREIGN PATENT DOCUMENTS

EP 1519471 A2 3/2005
JP 2000-178840 A 6/2000
WO WO-2008137709 A2 * 11/2008 ............. H02K 1/276

OTHER PUBLICATIONS

Text Version of WO 2008137709 A2 (Year: 2008).*
Extended European Search Report issued Oct. 29, 2024, in corresponding European Patent Application No. 24174725.2, 11pp.

* cited by examiner

*Primary Examiner* — Alexander A Singh
*Assistant Examiner* — Charlie Frank Mann, Jr.
(74) *Attorney, Agent, or Firm* — XSENSUS LLP

(57) ABSTRACT

A motor includes a stator having a cylindrical shape and a rotor having a cylindrical shape provided in the stator and is rotatable about a central axis of the stator and is used to drive a driving wheel of a vehicle by rotation of the rotor. The rotor has a cage and a plurality of permanent magnets provided on an inner side of the cage and disposed side by side in a circumferential direction. The cage includes a plurality of first secondary conductors extend in a radial direction. The plurality of first secondary conductors are configured such that the permanent magnet is interposed between inner parts of first secondary conductors on opposite sides in the circumferential direction.

18 Claims, 9 Drawing Sheets

VEHICLE DRIVING MOTOR HAVING SECONDARY CONDUCTORS FOR MAGNETIC FLUX GUIDANCE

CROSS-REFERENCE TO RELATED APPLICATION

The present application claims priority to Japanese application number 2023-080423 filed in the Japanese Patent Office on May 15, 2023, the entire contents of which being incorporated herein by reference.

TECHNICAL FIELD

The present disclosure relates to a motor, and particularly to a motor used for driving a driving wheel of a vehicle.

BACKGROUND ART

Conventionally, it has been known that motors are used for driving various kinds of machines. For example, Patent Literature 1 discloses a motor for driving spinning machinery. The motor for driving spinning machinery includes a stator, a rotor disposed on the inner side of the stator, a cage unit provided for the rotor, and a permanent magnet unit provided on the inner side of the cage unit of the rotor, and is used for driving a spindle bearing a bobbin on which a thread is to be wound.

CITATION LIST

Patent Literature

[Patent Literature 1] Japanese Patent Laid-Open No. 2000-178840

SUMMARY

Problems to be Solved

As a vehicle driving motor provided for an electric automobile or the like, a permanent magnet motor is typically used. The permanent magnet motor can instantaneously generate the maximum motor torque in the slow rotation range of the motor and therefore has an advantage of ensuring a high travel start capability from the halt state. However, the permanent magnet motor has a high counter electromotive force in the fast rotation range of the motor, and therefore, the motor torque may be insufficient during traveling at a high speed, for example. Therefore, there is a demand for a vehicle driving motor capable of generating a motor torque required for driving a vehicle in both the slow rotation range and the fast rotation range of the motor.

To meet the demand, it can be considered that a motor for driving spinning machinery including a rotor with a permanent magnet unit capable of generating the maximum motor torque in the slow rotation range and a cage unit that is not affected by the counter electromotive force in the fast rotation range, such as the motor according Patent Literature 1, is used as a vehicle driving motor.

However, with the motor like the motor according to Patent Literature 1, since the permanent magnet unit is disposed on the inner side of the cage unit, the permanent magnet unit is disposed on the inner side in the rotor than the permanent magnet unit of a typical permanent magnet motor, so that the permanent magnet unit and the stator are spaced away from each other in the radial direction. Since the permanent magnet unit includes a plurality of permanent magnets disposed side by side in the circumferential direction, if the permanent magnets and the stator are spaced apart from each other in the radial direction, there is a possibility that at least part of the magnetic flux from a permanent magnet to the radial-direction outer side is not directed to the stator but leaks to other permanent magnets that are adjacent to the permanent magnet in the circumferential direction. In such a case, the leaked magnetic flux is not converted into the force for rotating the rotor, so that it can be difficult to generate a motor torque required for driving the vehicle.

Embodiments are directed to providing a motor that can prevent leakage of a magnetic flux between permanent magnets that are adjacent in the circumferential direction.

Means for Solving the Problems

Embodiments are directed to a motor including a stator having a cylindrical shape and a rotor having a cylindrical shape provided in the stator so as to be rotatable about an axis that is the same as a central axis of the stator, a driving wheel of a vehicle being driven by rotation of the rotor Specifically, the rotor has a cage unit and a permanent magnet unit provided on an inner side of the cage unit, the permanent magnet unit has a plurality of permanent magnets disposed side by side in a circumferential direction, the cage unit includes a plurality of secondary conductors that have a plate-like shape and extend in a radial direction, and the plurality of secondary conductors are configured such that the permanent magnet is interposed between inner parts of secondary conductors on opposite sides in the circumferential direction.

Outer ends of the plurality of secondary conductors may form an outer circumferential end part of the rotor.

Inner ends of the plurality of secondary conductors may be located on an inner side than inner ends of the plurality of permanent magnets.

A The cage unit may further include a plurality of other secondary conductors, the plurality of other secondary conductors are disposed side by side in the circumferential direction at circumferential positions corresponding to the plurality of permanent magnets on an outer side, and inner ends of the plurality of other secondary conductors are located on an outer side than inner ends of the plurality of secondary conductors.

The rotor may be divided into an outer rotor part and an inner rotor part, the plurality of permanent magnets are housed in a housing part provided between the outer rotor part and the inner rotor part in the radial direction, and the housing part is filled with a resin material for coupling the outer rotor part, the inner rotor part and the plurality of permanent magnets to each other.

Advantageous Effects

Since the magnetic flux from each permanent magnet to the radial-direction outer side is guided to the outer side of the rotor by each secondary conductor and is directed to the stator. In this way, the magnetic flux can be prevented from leaking to adjacent other permanent magnets. In addition, since the leakage is prevented by using the secondary conductors of the cage unit, no additional member for preventing the leakage of the magnetic flux is required. Therefore, the cost of the motor can be reduced.

Further, when the plurality of secondary conductors extend from the vicinity of the plurality of permanent magnets to the outer circumferential end part of the rotor in the radial direction. Therefore, the magnetic flux can be guided to the stator with higher reliability compared with a case where the outer end of each secondary conductor is located in a radially halfway portion of the rotor.

Further, when the plurality of secondary conductors extend to the inner side than the plurality of permanent magnets. Therefore, the permanent magnets that are adjacent in the circumferential direction are separated by the secondary conductors, so that the leakage of the magnetic flux can be prevented with higher reliability.

Further, when the inner ends of the plurality of other second secondary conductors are located on the outer side than the inner ends of the plurality of secondary conductors, a region in which the plurality of permanent magnets are disposed can be provided on the inner side of the plurality of other secondary conductors.

Further, when the outer rotor part, the inner rotor part and the plurality of permanent magnets are coupled to each other by the resin material, they can be prevented from being displaced from their respective appropriate positions.

DETAILED DESCRIPTION

In the following, an embodiment will be described in detail. The embodiment described below is essentially intended for illustration purposes.

Figure 1:
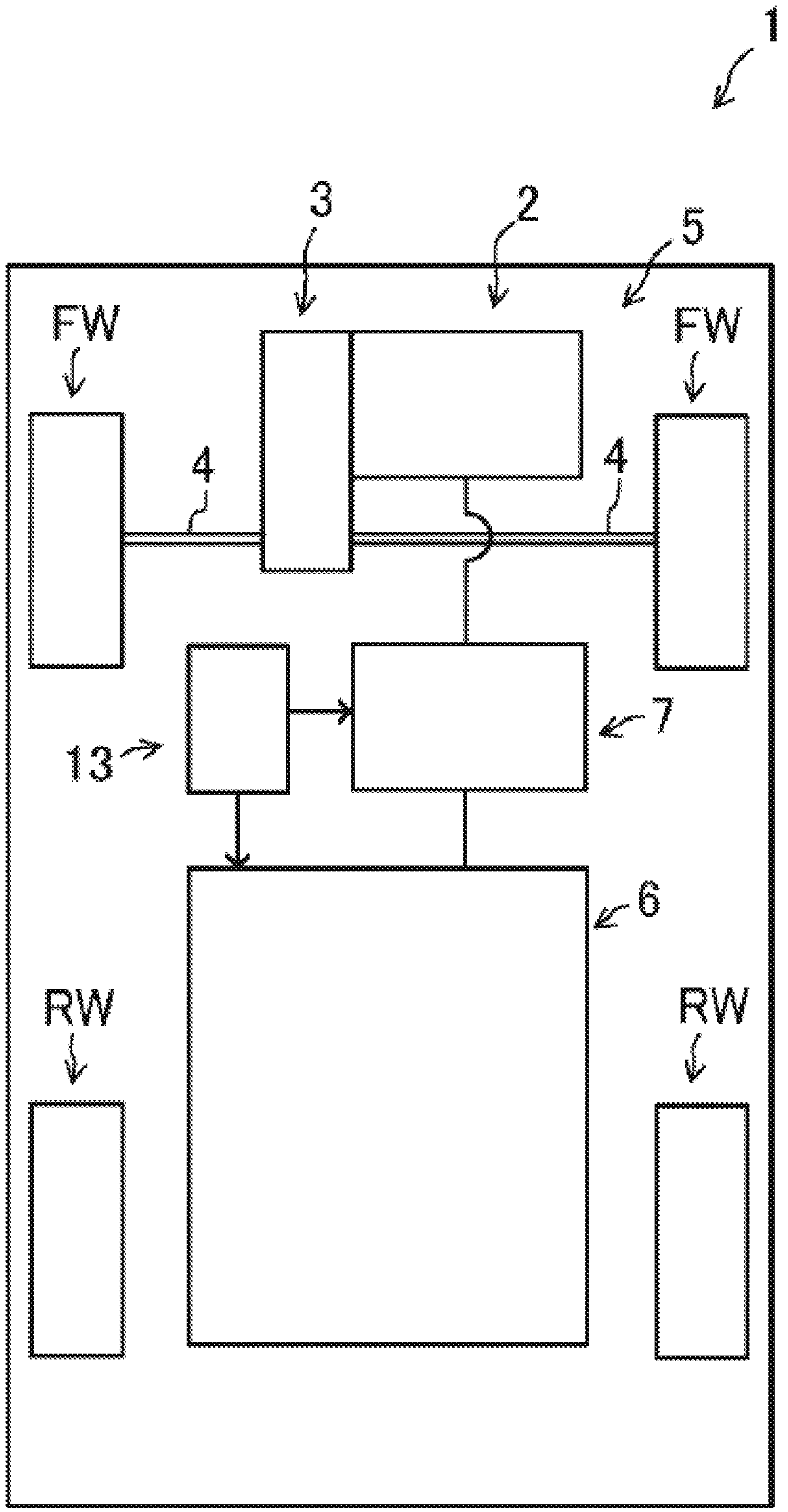
FIG. 1 is a plan view showing a schematic configuration of a vehicle equipped with a motor according to an embodiment.

FIG. 1 shows a vehicle 1 on which a motor 2 according to an embodiment is mounted. The vehicle 1 is a front-wheel-drive electric automobile on which a motor 2 as a drive source is mounted. The vehicle 1 includes a speed reducer 3, a pair of left and right drive shafts 4, a pair of left and right front wheels FW (driving wheels), and a pair of left and right rear wheels RW (driven wheels).

The motor 2 is disposed in a motor room provided in a front part of the vehicle 1. The motor 2 is coupled with the front wheels FW via the speed reducer 3 and the drive shafts 4. In this way, a motor torque (wheel driving force) generated by the motor 2 is transferred to the left and right front wheels FW via the speed reducer 3 and the left and right drive shafts 4.

Figure 2:
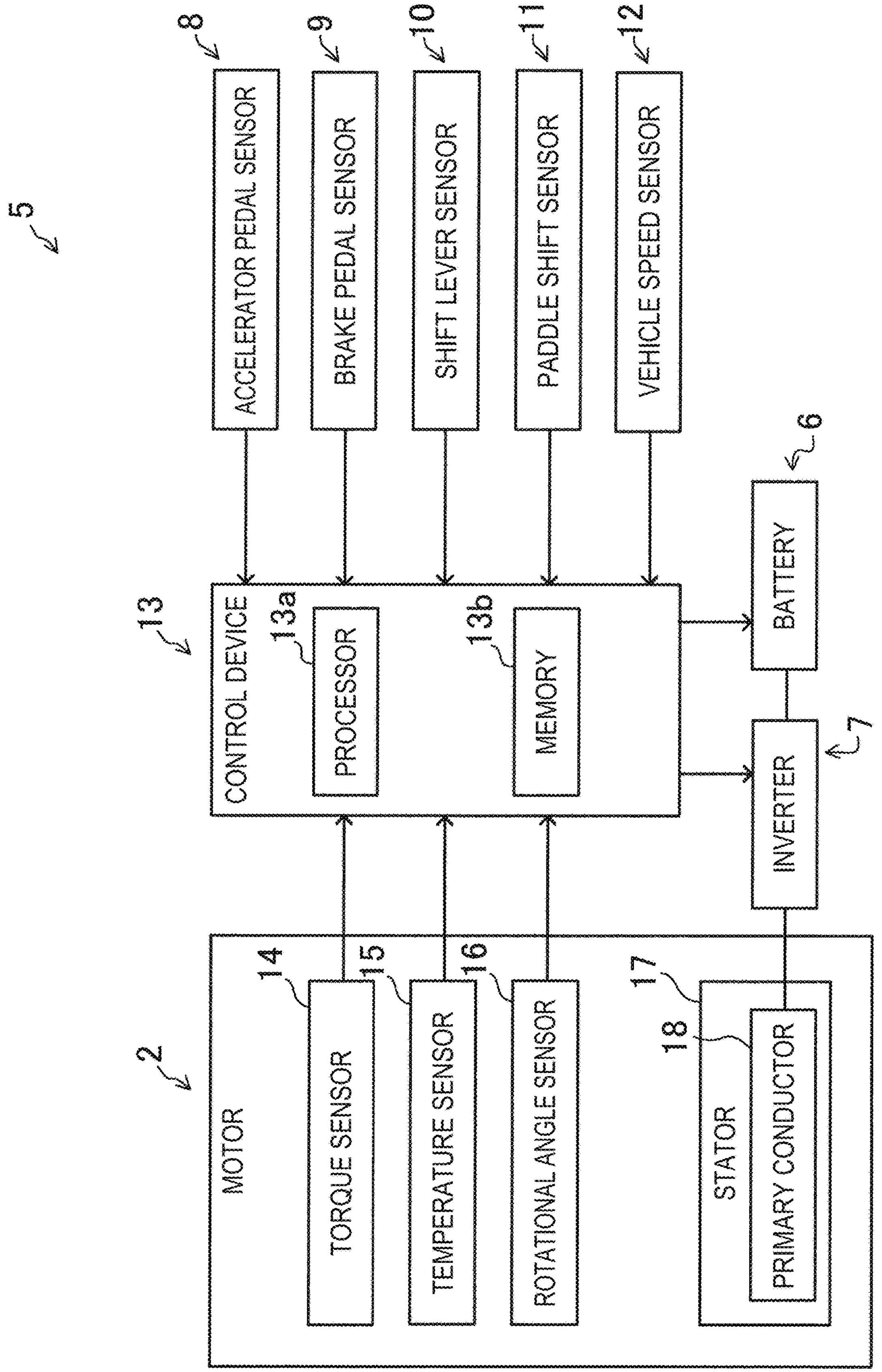
FIG. 2 is a block diagram showing the vehicle driving system.

Next, with reference to FIG. 2, the vehicle driving system 5 mounted on the vehicle 1 will be described.

The vehicle driving system 5 includes the motor 2, a battery 6, an inverter 7, an accelerator pedal sensor 8, a brake pedal sensor 9, a shift lever sensor 10, a paddle shift sensor 11, a vehicle speed sensor 12, and a control device 13.

The motor 2 includes a torque sensor 14, a temperature sensor 15, a rotational angle sensor 16 and a stator 17.

The torque sensor 14 is a sensor capable of detecting an actual motor torque generated by the motor 2. The torque sensor 14 is configured to transmit detected actual motor torque information of the motor 2 to the control device 13.

The temperature sensor 15 is a sensor (an infrared sensor, for example) capable of detecting an actual temperature of a permanent magnet unit 28 (see FIG. 3) of the motor 2. The temperature sensor 15 is configured to transmit detected actual temperature information of the permanent magnet unit 28 to the control device 13.

The rotational angle sensor 16 is a sensor (a resolver or an encoder, for example) capable of detecting a rotational angle of a rotor 19 (see FIG. 3) of the motor 2. The rotational angle sensor 16 is configured to transmit detected rotational angle information to the control device 13.

The stator 17 includes a plurality of primary conductors 18. The plurality of primary conductors 18 are electrically connected to the inverter 7.

The battery 6 is a lithium-ion battery, for example, and is capable of being charged with and discharging a direct current. The battery 6 is electrically connected to the motor 2 via the inverter 7.

The inverter 7 is capable of conversion between a direct current and an alternating current (a three-phase alternating current, for example). The inverter 7 is capable of performing a mode of converting a direct current discharged from the battery 6 into an alternating current and then supplying the alternating current to the motor 2 and a mode of converting an alternating current (regenerated current) output from the motor 2 into a direct current and then charging the battery 6 with the direct current.

The accelerator pedal sensor 8 is a sensor capable of detecting a depression amount (accelerator opening) of an accelerator pedal by a driver of the vehicle 1. The accelerator pedal sensor 8 is configured to transmit detected depression amount information of the accelerator pedal to the control device 13.

The brake pedal sensor 9 is a sensor capable of detecting a depression amount (brake opening) of a brake pedal by the driver of the vehicle 1. The brake pedal sensor 9 is configured to transmit detected depression amount information of the brake pedal to the control device 13.

The shift lever sensor 10 is a sensor (a range sensor, for example) capable of detecting a position (shift position) of a shift lever selected by the driver of the vehicle 1. In this embodiment, the driver can select any shift position from parking (parking range), reverse (reverse range), neutral (neutral range), drive (traveling range), and manual (manual range) by manually operating the shift lever. The shift lever sensor 10 is configured to transmit detected shift position information to the control device 13. In this embodiment, in the manual (manual range), the shift lever sensor 10 is configured to transmit, to the control device 13, information (plus operation information) about an operation of moving the shift lever from a reference position to a vehicle front side performed by the driver of the vehicle 1 or information (minus operation information) about an operation of moving the shift lever from the reference position to a vehicle rear side performed by the driver of the vehicle 1. Note that in the manual (manual range), the shift lever is configured to return to the reference position when the driver of the vehicle 1 releases the shift lever.

The paddle shift sensor 11 is a sensor capable of detecting an operation of a pair of left and right paddle shift switches provided on a steering wheel. The paddle shift sensor 11 is configured to transmit detected operation information of the paddle shift switches to the control device 13. In this embodiment, the paddle shift sensor 11 is configured to transmit, to the control device 13, operation information (plus operation information) about an operation of the right paddle shift switch performed by the driver of the vehicle 1 or operation information (minus operation information) about an operation of the left paddle shift switch performed by the driver of the vehicle 1.

The vehicle speed sensor 12 is a sensor (wheel speed sensors for the front wheels FW and the rear wheels RW) capable of detecting a vehicle speed of the vehicle 1. The vehicle speed sensor 12 is configured to transmit detected vehicle speed information to the control device 13.

The control device 13 is configured to control the motor 2, the battery 6 and the inverter 7 based on the information received from the sensors. Note that the motor 2 is configured to be indirectly controlled via the inverter 7.

The control device 13 includes a processor 13*a* and a memory 13*b* storing a control program. The control device 13 is configured to control the motor 2, the battery 6 and the inverter 7 by performing execution of the control program stored in the memory 13*b* based on the information received from the sensors by the processor 13*a*.

Figure 3:
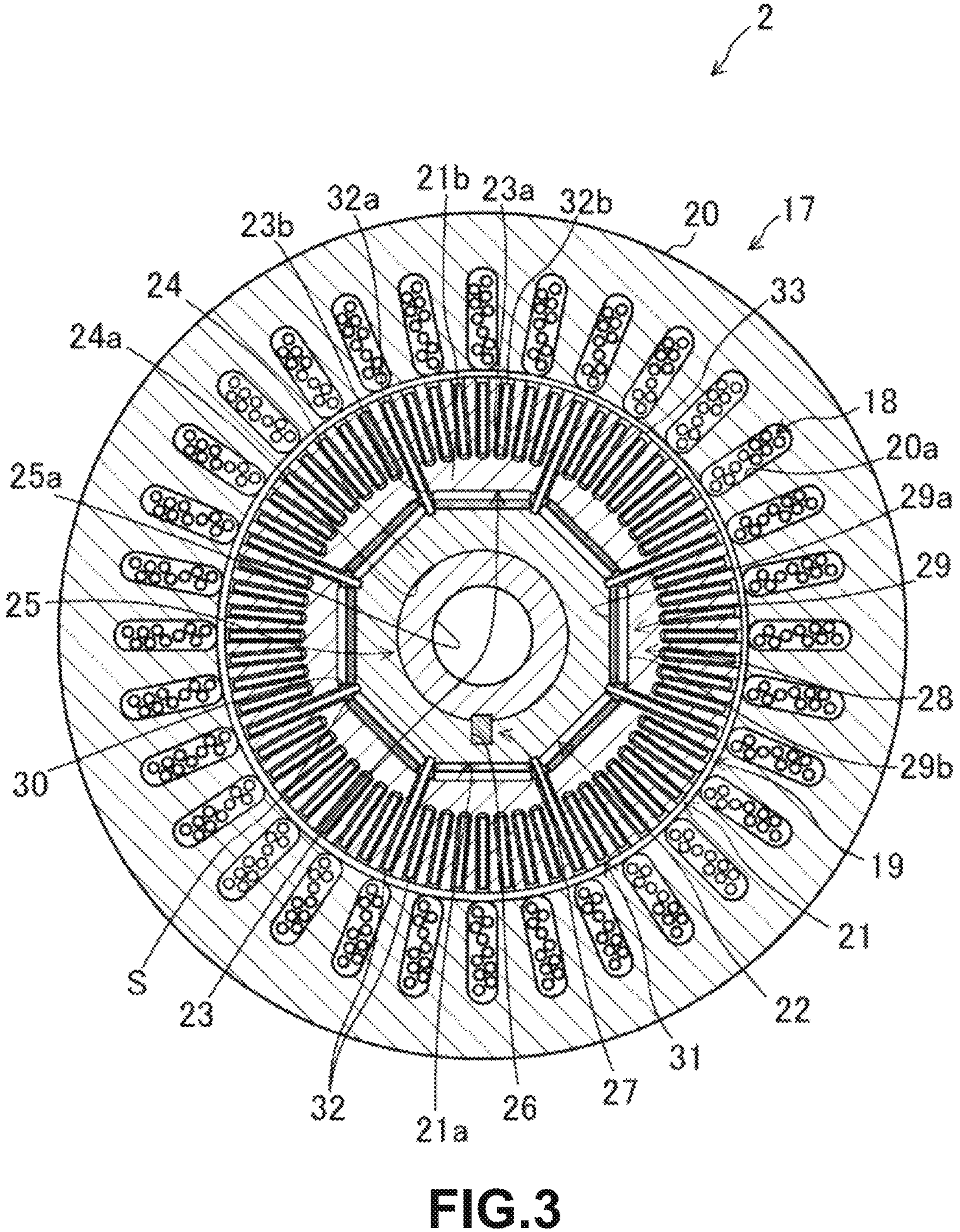
FIG. 3 is a schematic cross-sectional view showing a radial cross section of a motor.

Next, a detailed structure of the motor 2 will be described with reference to FIG. 3.

The motor 2 includes the stator 17 having a substantially cylindrical shape and the rotor 19 having a substantially cylindrical shape that is provided in the stator 17 so as to be rotatable about an axis that is the same as a central axis of the stator 17.

The stator 17 includes a stator core 20 and a plurality of primary conductors 18 (primary coils).

The stator core 20 includes a plurality of electromagnetic steel sheets having a substantially annular shape stacked in an axial direction. The stator core 20 also includes a plurality of slots 20*a* that are recessed from an inner circumferential surface of the stator core 20 to a radial-direction outer side. The plurality of slots 20*a* are disposed side by side at predetermined intervals in a circumferential direction. The slots 20*a* house the plurality of primary conductors 18. The plurality of primary conductors 18 are U-phase coils, V-phase coils and W-phase coils, for example, and each coil is housed in a corresponding slot 20*a*.

Alternating currents shifted in phase by 120° are supplied to the U-phase coils, the V-phase coils and the W-phase coils from the inverter 7. When the alternating currents are supplied from the inverter 7 to the primary conductors 18, the primary conductors 18 produces a rotating magnetic field.

The rotor 19 is divided into an outer rotor part 21 and an inner rotor part 22 in a radial direction.

The outer rotor part 21 has a substantially annular shape when viewed in the axial direction. That is, the radial cross section is in a substantially annular shape. In the outer rotor part 21, a first through-hole 21*a* that penetrates in the axial direction is formed. The first through-hole 21*a* has the shape of an opening in a substantially octagonal shape when viewed in the axial direction.

The outer rotor part 21 further includes an outer rotor core 23 that has a plurality of blocks 21*b*. Each block 21*b* is made of a magnetic material, such as iron, and is formed to have a cross-sectional shape of an isosceles trapezoid with an arc-shaped bottom side when viewed in the axial direction. The outer rotor core 23 includes the plurality of blocks 21*b* that are disposed side by side at predetermined intervals in the circumferential direction.

The outer rotor core 23 includes a plurality of housing recesses 23*a* that are recessed from an outer circumferential surface of the outer rotor core 23 to a radial-direction inner side and a plurality of second through-holes 23*b* formed to penetrate the outer rotor core 23 from the inner circumferential surface to the outer circumferential surface in the radial direction. The plurality of housing recesses 23*a* and the plurality of second through-holes 23*b* are disposed side by side at predetermined intervals in the circumferential direction.

The inner rotor part 22 has a substantially octagonal shape when viewed in the axial direction, that is, the radial cross section is in a substantially octagonal shape. The inner rotor part 22 includes an inner rotor core 24 that includes a plurality of electromagnetic steel sheets having a substantially octagonal shape stacked in the axial direction.

In a central part of the inner rotor core 24, a third through-hole 24*a* that penetrates in the axial direction is formed. An output shaft 25 having a substantially cylindrical shape is inserted in the third through-hole 24*a*. A cooling passage 25*a* through which a cooling medium is supplied is formed in the output shaft 25.

The inner rotor core 24 (rotor 19) and the output shaft 25 are coupled to each other so as to integrally rotate. In this embodiment, a key 27 provided on an outer circumferential surface of the output shaft 25 is fitted in a key groove 26 provided in an inner circumferential surface of the inner rotor core 24, thereby coupling the inner rotor core 24 (rotor 19) and the output shaft 25 to each other in a relatively non-rotatable manner.

A housing space S having a substantially annular shape is provided between the outer rotor part 21 and the inner rotor part 22 in the radial direction. The housing space S is connected to radially-inner ends of the plurality of second through-holes 23*b*. The housing space S houses the permanent magnet unit 28.

The permanent magnet unit 28 includes a plurality of permanent magnets 29 extending in the axial direction arranged in the circumferential direction. The plurality of permanent magnets 29 are formed by ferrite magnets (for example, hard ferrite magnets such as barium ferrite magnets or strontium ferrite magnets). The ferrite magnet has properties of being hardly irreversibly demagnetized at high temperatures and being easily irreversibly demagnetized at low temperatures. That is, the ferrite magnet has opposite properties to rare-earth magnets (the neodymium magnet or the samarium-cobalt magnet, for example) having properties of being easily irreversibly demagnetized at high temperatures and being hardly irreversibly demagnetized at low temperatures.

The plurality of permanent magnets 29 have a plate-like shape and have a N-pole part 29*a* on one side in a thickness direction of the permanent magnet 29 and a S-pole part 29*b* on the other side in the thickness direction.

The plurality of permanent magnets 29 are disposed side by side at predetermined intervals in the circumferential direction in the housing space S. In this embodiment, each permanent magnet 29 is disposed at a circumferential position corresponding to one of the eight surfaces forming the outer circumferential surface of the inner rotor part 22. Furthermore, the plurality of permanent magnets 29 are orientated so that the respective thickness directions substantially agree with the radial direction.

The plurality of permanent magnets 29 are disposed in such a manner that the N-pole parts 29*a* and the S-pole parts 29*b* alternate. More specifically, a predetermined permanent magnet 29 is disposed with the N-pole part 29*a* on the outer side and the S-pole part 29*b* on the inner side. On the other hand, a permanent magnet 29 adjacent to the predetermined permanent magnet 29 in the circumferential direction is disposed with the S-pole part 29*b* on the outer side and the N-pole part 29*a* on the inner side. In this way, on the outer side of the plurality of permanent magnets 29, the N-pole part 29*a* and the S-pole part 29*b* are disposed alternately in the circumferential direction.

A surface of each permanent magnet 29 on one side in the thickness direction is in contact with the inner circumferential surface of the outer rotor part 21. A surface of each permanent magnet 29 on the other side in the thickness direction is in contact with the outer circumferential surface of the inner rotor part 22.

Radially-inner parts of the second through-holes 23*b* and the housing space S are filled with a resin material 30. That is, parts of the radially-inner parts of the second through-holes 23*b* and the housing space S that are not occupied by the permanent magnets 29 are filled with the resin material 30. The resin material 30 couples the outer rotor part 21, the inner rotor part 22 and the permanent magnets 29 to each other.

A cage unit 31 is provided on the outer side of the permanent magnet unit 28. In other words, the permanent magnet unit 28 is provided on the inner side of the cage unit 31.

The cage unit 31 includes a plurality of secondary conductors (secondary coils) 32 having a substantially plate-like shape and a pair of short-circuit rings having a substantially annular shape. The plurality of secondary conductors 32 and the short-circuit rings are made of a non-magnetic conductor (aluminum or copper, for example). The axial ends of each of the plurality of secondary conductors 32 are coupled to different short-circuit rings.

The plurality of secondary conductors 32 includes a plurality of first secondary conductors 32*a* extending in the axial direction and the radial direction and a plurality of second secondary conductors 32*b*. The first secondary conductors 32*a* are disposed side by side at intervals of about 45° in the circumferential direction. A plurality of second secondary conductors 32*b* are disposed side by side between the first secondary conductors 32*a* in the circumferential direction.

The plurality of first secondary conductors 32*a* are housed in the plurality of second through-holes 23*b* and the housing space S. Furthermore, inner parts of the plurality of first secondary conductors 32*a* are interposed between permanent magnets 29 that are adjacent in the circumferential direction. That is, each permanent magnet 29 is interposed between inner parts of the plurality of first secondary conductors 32*a* on the opposite sides in the circumferential direction. In this way, the plurality of first secondary conductors 32*a* serve as walls that separate the permanent magnets 29 that are adjacent in the circumferential direction. Therefore, the plurality of first secondary conductors 32*a* block a magnetic flux from a permanent magnet 29 to the radial-direction outer side from leaking (leakage) to other permanent magnets 29 adjacent in the circumferential direction. The blocked magnetic flux is guided to the stator 17 by the plurality of first secondary conductors 32*a* and contributes to the generation of the motor torque.

Outer ends of the plurality of first secondary conductors 32*a* form an outer circumferential end part of the rotor 19. That is, the outer ends of the plurality of first secondary conductors 32*a* are located near the outer circumferential surface of the outer rotor core 23 (outer rotor part 21). Inner ends of the plurality of first secondary conductors 32*a* are located on the inner side than inner ends of the plurality of permanent magnets 29. Thus, the plurality of first secondary conductors 32*a* extends in the radial direction from positions on the inner side of the permanent magnets 29 to the outer circumferential end part of the rotor 19. Therefore, leaking (leakage) of the magnetic flux between permanent magnets 29 that are adjacent in the circumferential direction can be prevented with higher reliability.

The plurality of second secondary conductors 32*b* are housed in the plurality of housing recesses 23*a* disposed side by side in the circumferential direction. The plurality of housing recesses 23*a* are provided at circumferential positions corresponding to the permanent magnets 29 on the outer side of the permanent magnets 29. Therefore, the plurality of second secondary conductors 32*b* are disposed side by side in the circumferential direction at circumferential positions corresponding to the permanent magnets 29 on the outer side of the permanent magnets 29.

Outer ends of the plurality of second secondary conductors 32*b* form the outer circumferential end part of the rotor 19. That is, the outer ends of the plurality of first secondary conductors 32*a* are located near the outer circumferential end of the outer rotor core 23 (outer rotor part 21), and are located at radial positions that are substantially agree with the radial positions of the outer ends of the plurality of first secondary conductors 32*a*.

Inner ends of the plurality of second secondary conductors 32*b* are located on the outer side than inner ends of the plurality of permanent magnets 29. That is, the inner ends of the plurality of second secondary conductors 32*b* are located on the outer side than the inner ends of the plurality of first secondary conductors 32*a*. In this way, a space in which the plurality of permanent magnets 29 are disposed is provided in a region on the inner side of the plurality of second secondary conductors 32*b*.

The housing space S is filled with a resin material 30. That is, a part of the housing space S that is not occupied by the plurality of permanent magnets 29 and the plurality of first secondary conductors 32*a* is filled with the resin material 30. The resin material 30 couples the outer rotor part 21 including the plurality of first secondary conductors 32*a*, the inner rotor part 22 and the permanent magnets 29 to each other.

A cover 33 having a cylindrical shape for preventing flying out of the rotor (which is made of carbon fiber-reinforced plastics, for example) is wound around the outer periphery of the outer rotor core 23. In this way, the outer rotor part 21, the inner rotor part 22 and the permanent magnet unit 28 are firmly coupled to each other.

Figure 4:
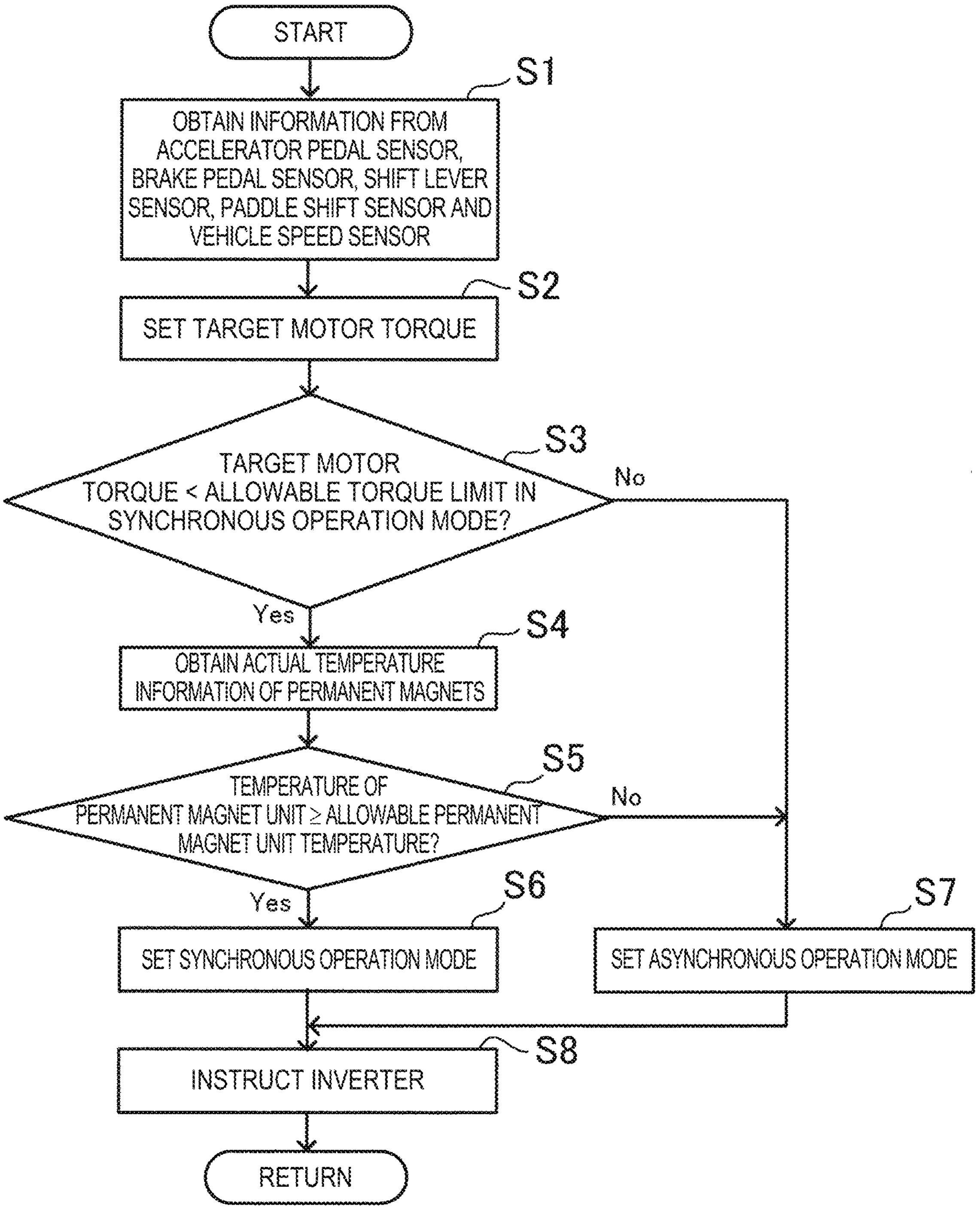
FIG. 4 is a flowchart showing an example of a control process by a control device.

Next, with reference to FIG. 4, an example of a process of a control program executed by the processor 13*a* of the control device 13 will be described.

In Step S1, information transmitted from the accelerator pedal sensor 8, the brake pedal sensor 9, the shift lever sensor 10, the paddle shift sensor 11 and the vehicle speed sensor 12 is obtained.

In Step S2, a target motor torque is set based on the information obtained in Step S1. The target motor torque is a motor torque required by the driver of the vehicle 1.

When information indicating that the accelerator pedal is depressed by the driver is obtained from the accelerator pedal sensor 8, a target motor torque on a driving side (positive side) for driving the vehicle 1 is set. On the other hand, when information indicating that the brake pedal is depressed by the driver is obtained from the brake pedal sensor 9, a target motor torque on a regeneration side (negative side) for decelerating the vehicle 1 is set. Furthermore, the greater the depression amount of the accelerator pedal obtained from the accelerator pedal sensor 8 or the greater the depression amount of the brake pedal obtained from the brake pedal sensor 9, the greater the target motor torque set is.

When the shift position information obtained from the shift lever sensor 10 indicates parking or neutral, the target motor torque is set at 0. On the other hand, when the shift position information indicates reverse, drive or manual, the target torque is set at a value greater than 0. When the shift position information indicates manual and the shift lever is operated from the reference position, the target motor torque is decreased if the shift position information is information (plus operation information) indicating that the shift lever is operated from the reference position to the vehicle front side, and increased if the shift position information is information (minus operation information) indicating that the shift lever is operated from the reference position to the vehicle rear side.

When the operation information of the paddle shift switches obtained from the paddle shift sensor 11 indicates that a paddle shift switch is operated, the target motor torque is decreased if the operation information is plus operation information, and is increased if the operation information is minus operation information.

Furthermore, when the vehicle speed of the vehicle 1 obtained from the vehicle speed sensor 12 is high, the target motor torque is decreased compared with the other cases.

In Step S3, it is determined whether or not the target motor torque of the motor 2 set in Step S2 is smaller than an allowable torque limit in a predetermined synchronous operation mode. The allowable torque limit is set in advance from the magnetic force of the permanent magnet unit 28 mounted on the motor 2, for example.

When the determination result in Step S3 is Yes, the process proceeds to Step S4. On the other hand, when the determination result in Step S3 is No, the process proceeds to Step S7.

In Step S4, the actual temperature information of the permanent magnet unit 28 of the motor 2 is obtained from the temperature sensor 15, and then, the process proceeds to Step S5.

In Step S5, it is determined whether or not the actual temperature of the permanent magnet unit 28 is equal to or higher than an allowable permanent magnet unit temperature. The allowable permanent magnet unit temperature (a predetermined temperature) is set at 0 degrees Celsius or below (e.g., −40 degrees Celsius) so that when the temperature of the permanent magnet unit 28 is lower than the allowable permanent magnet unit temperature, the permanent magnet unit 28 (permanent magnets 29) can be irreversibly demagnetized.

When the determination result in Step S5 is Yes, the process proceeds to Step S6. In Step S6, the operation mode of the motor 2 is set at the synchronous operation mode, and then, the process proceeds to Step S8.

On the other hand, when the determination result in Step S5 is No, the process proceeds to Step S7.

In Step S7 (when the determination result in Step S3 is No or when the determination result in Step S5 is No), the operation mode of the motor 2 is set at an asynchronous operation mode, and then, the process proceeds to Step S8.

In Step S8, the inverter 7 is instructed so that the operation mode set in Step S6 or S7 occurs and the target motor torque set in Step S2 is generated, and then, the process returns. After that, the process is started again from Step S1 in FIG. 4, and the process in FIG. 4 is repeated. Note that such a configuration is adopted that in Step S8, in order to make the motor 2 generate the target motor torque, the inverter 7 is instructed so that the positions of the magnetic poles of the magnets of the rotor 19 are estimated from the rotational angle information of the rotor 19 obtained from the rotational angle sensor 16, and an alternating current having a predetermined phase, advanced position and magnitude with respect to the estimated positions of the magnetic poles of the magnets is passed through the primary conductors 18.

In this embodiment, when the synchronous operation mode is set in Step S6 while the motor 2 is operating in the asynchronous operation mode, the inverter 7 is instructed in Step S8 to switch from the asynchronous operation mode to the synchronous operation mode. When the asynchronous operation mode is set in Step S7 while the motor 2 is operating in the synchronous operation mode, the inverter 7 is instructed in Step S8 to switch from the synchronous operation mode to the asynchronous operation mode.

Next, with reference to FIG. 5, the synchronous operation mode in which the rotor 19 is rotated using the magnetic force of the permanent magnet unit 28 will be described. The synchronous operation mode is an operation mode in which the rotor 19 is rotated at a rotational speed (synchronous speed) of the rotating magnetic field. That is, in the synchronous operation mode, the rotational speed of the rotor 19 agrees with the rotational speed (synchronous speed) of the rotating magnetic field.

Figure 5:
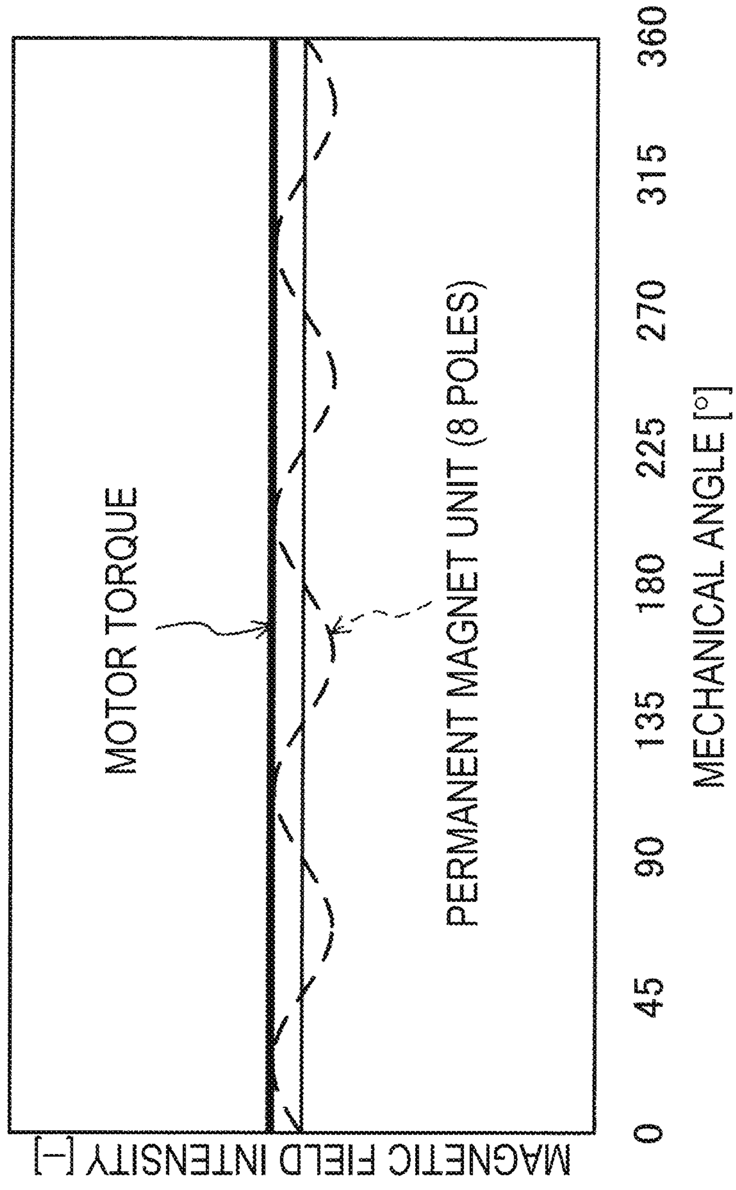
FIG. 5 is a diagram showing a motor torque in a synchronous operation mode.

In FIG. 5, the vertical axis indicates the magnetic field intensity (the spatial magnetic flux density [−] corresponding to the magnetic field intensity), and the horizontal axis indicates the mechanical angle [°]. In FIG. 5, the dashed line indicates characteristics of the magnetic field intensity of the permanent magnet unit 28 with respect to the mechanical angle, and the thick solid line indicates the motor torque with respect to the mechanical angle. Note that in this embodiment, since the permanent magnet unit 28 includes eight permanent magnets 29, the number of poles (the numbers of the N poles and the S poles) of the permanent magnet unit 28 is eight.

When the motor 2 operates in the synchronous operation mode, an alternating current is supplied from the inverter 7 to the primary conductors 18 of the stator 17. When the alternating current is supplied, the primary conductors 18 produce a rotating magnetic field. In the synchronous operation mode, the number of the magnetic poles of the rotating magnetic field is eight (8 poles).

In the synchronous operation mode, since the rotor 19 rotates at the synchronous speed, the rotating magnetic field does not intersect with the secondary conductors 32 of the cage unit 31. That is, no speed difference (slip) occurs between the rotating magnetic field and the secondary conductors 32. Therefore, no secondary current (induced current) flows in the secondary conductors 32, so that the cage unit 31 does not contribute to the generation of the motor torque. Therefore, in the synchronous operation mode, the force that makes the output shaft 25 of the motor 2 rotate, that is, the motor torque, is generated by the rotating magnetic field and the magnetic field of the permanent magnet unit 28. Note that in the synchronous operation mode, as shown by the thick solid line in FIG. 5, the motor torque is generated by the rotating magnetic field and the magnetic field of the permanent magnet unit 28, and there is no pulsating component, so that no pulsation of the motor torque occurs.

Next, with reference to FIG. 6, the asynchronous operation mode in which the rotor 19 is rotated using the secondary current (induced current) in the secondary conductors 32 of the cage unit 31 will be described. The asynchronous operation mode is an operation mode in which the rotor 19 is rotated at a rotational speed that is different from the rotational speed (synchronous speed) of the rotating magnetic field. That is, in the asynchronous operation mode, the rotational speed of the rotor 19 does not agree with the rotational speed (synchronous speed) of the rotating magnetic field.

Figure 6:
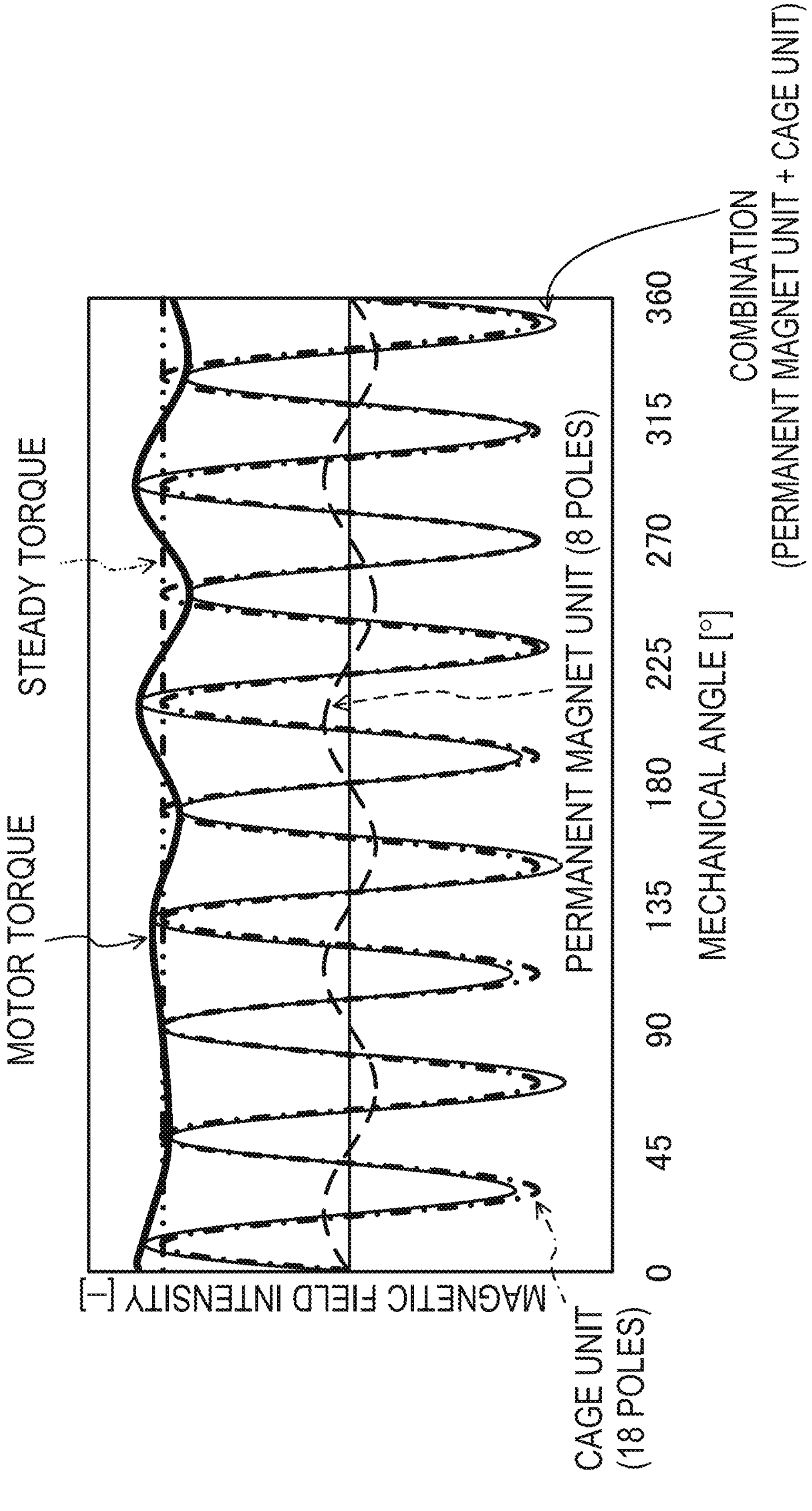
FIG. 6 is a diagram showing a motor torque in an asynchronous operation mode.

In FIG. 6, as in FIG. 5, the vertical axis indicates the magnetic field intensity (the spatial magnetic flux density [–] corresponding to the magnetic field intensity), and the horizontal axis indicates the mechanical angle [°].

In FIG. 6, the dashed line indicates characteristics of the magnetic field intensity of the permanent magnet unit 28 with respect to the mechanical angle, the alternate long and short dash line indicates characteristics of the magnetic field intensity of the cage unit 31 with respect to the mechanical angle, the solid line indicates characteristics of the magnetic field intensity of a combination (the permanent magnet unit 28 and the cage unit 31) with respect to the mechanical angle, the thick solid line indicates the motor torque with respect to the mechanical angle, and the alternate long and two short dash line indicates a steady torque (the motor torque generated by only the magnetic field of the cage unit 31) with respect to the mechanical angle.

When the motor 2 operates in the asynchronous operation mode, as in the synchronous operation mode, an alternating current is supplied from the inverter 7 to the primary conductors 18 of the stator 17. When the alternating current is supplied, the primary conductors 18 produce a rotating magnetic field. In the asynchronous operation mode, the rotating magnetic field has eighteen magnetic poles (18 poles). Note that in this embodiment, the inverter 7 is configured to be able to arbitrarily change the number of magnetic poles (number of poles) of the rotating magnetic field of the stator 17 by changing the direction of the current flowing in each of the plurality of primary conductors 18 to increase or decrease the number of the primary conductors 18 in which the current flows in the same direction consecutively arranged in the circumferential direction.

In the asynchronous operation mode, since the rotor 19 rotates at a speed (asynchronous speed) that is different from the synchronous speed, the rotating magnetic field intersects with the secondary conductors 32 of the cage unit 31. That is, a speed difference (slip) occurs between the rotating magnetic field and the secondary conductors 32. Therefore, a secondary current (induced current) flows in the secondary conductors 32, so that eighteen magnetic poles (18 poles) are formed in the cage unit 31 (rotor 19), as with the rotating magnetic field of the stator 17 (see FIG. 6).

In the asynchronous operation mode, the magnetic field of the permanent magnet unit 28 is acting in the motor 2, as in the synchronous operation mode. The magnetic field of the permanent magnet unit 28 has eight magnetic poles (8 poles) as shown in FIG. 6. Therefore, in the asynchronous operation mode, the magnetic field of the permanent magnet unit 28 and the magnetic field of the cage unit 31 are combined (see the solid line in FIG. 6).

In this embodiment, since the number of poles of the permanent magnet unit 28 (8 poles) and the number of poles of the magnetic field of the cage unit 31 (18 poles) do not agree with each other, the cycle of the magnetic field intensity of the permanent magnet unit 28 with respect to the mechanical angle and the cycle of the magnetic field intensity of the cage unit 31 with respect to the mechanical angle are different. In other words, a phase difference occurs between the magnetic field of the permanent magnet unit 28 and the magnetic field of the cage unit 31. Therefore, the intensity of the combined magnetic field of the permanent magnet unit 28 and the cage unit 31 pulsates. In this embodiment, the magnetic field intensity of the cage unit 31 is greater than the magnetic field intensity of the permanent magnet unit 28, and therefore, the magnetic field intensity of the permanent magnet unit 28 is a component that causes the combined magnetic field intensity to pulsate.

Since the combined magnetic field intensity pulsates, the motor torque generated by the combined magnetic field and the rotating magnetic field pulsates (see the thick solid line in FIG. 6). In other words, the motor torque does not agree with the steady torque generated by only the magnetic field of the cage unit 31 (see the alternate long and two short dash line in FIG. 6) but pulsates (varies) as shown by the thick solid line in FIG. 6. When the motor torque pulsates, the angular velocity of the output shaft 25 of the motor 2 varies as with the crank shaft during combustion of an engine. Therefore, an angular velocity variation similar to that of the engine can be produced in the motor 2 in a pseudo manner.

The angular velocity variation of the output shaft 25 of the motor 2, that is, the vibration of the motor 2, is transferred from the motor 2 to the vehicle 1. The driver of the vehicle 1 can grasp the operational state of the motor 2 from the vibration of the motor 2 transferred to a vehicle cabin described above. In this way, a driver who is used to drive a vehicle equipped with an engine (engine vehicle) can be prevented from feeling strange when the driver cannot grasp the operational state of the motor 2 from the vibration of the motor 2 transferred to the vehicle cabin when driving the vehicle 1 (electric automobile) equipped with the motor 2.

As described above, according to the embodiment, the magnetic flux from each permanent magnet 29 to the radial-direction outer side is guided to the outer side of the rotor 19 by the first secondary conductors 32*a* and is directed to the stator 17. In this way, the magnetic flux can be prevented from leaking to adjacent other permanent magnets 29. In addition, since the leakage is prevented by using the first secondary conductors 32*a* of the cage unit 31, no additional member for preventing the leakage of the magnetic flux is required. Therefore, the cost of the motor 2 can be reduced.

In addition, the plurality of first secondary conductors 32*a* extend from the vicinity of the plurality of permanent magnets 29 to the outer circumferential end part of the rotor 19 in the radial direction. Therefore, the magnetic flux can be guided to the stator 17 with higher reliability compared with a case where the outer end of each first secondary conductor 32*a* is located in a radially halfway portion of the rotor 19.

In addition, the plurality of first secondary conductors 32*a* extend to the inner side than the plurality of permanent magnets 29. Therefore, the permanent magnets 29 that are adjacent in the circumferential direction are separated by the first secondary conductors 32*a*, so that the leakage of the magnetic flux can be prevented with higher reliability.

In addition, since the inner ends of the plurality of second secondary conductors 32*b* are located on the outer side than the inner ends of the plurality of first secondary conductors 32*a*, a region in which the plurality of permanent magnets 29 are disposed can be provided on the inner side of the plurality of second secondary conductors 32*b*.

In addition, the outer rotor part 21, the inner rotor part 22 and the plurality of permanent magnets 29 are coupled to each other by the resin material 30. Therefore, the outer rotor part 21, the inner rotor part 22 and the plurality of permanent magnets 29 can be prevented from being displaced from their respective appropriate positions.

<Variations>

Note that although the inner rotor part 22 has a substantially octagonal shape when viewed in the axial direction in the embodiment, the inner rotor part 22 may have other polygonal shapes than the substantially octagonal shape (a substantially hexagonal shape, a substantially heptagonal shape, a substantially nonagonal shape, a substantially decagonal shape or a substantially dodecagonal shape, for example).

Although the permanent magnet 29 is formed by a ferrite magnet in this embodiment, the permanent magnet 29 may be formed by a rare-earth magnet.

Although the permanent magnet 29 has a plate-like shape in the embodiment, the permanent magnet 29 may have other shapes than the plate-like shape (an arc shape, for example).

Although the embodiment has been described with reference to an example in which the number of poles of the permanent magnet unit 28 is eight, the number of poles may be other than eight (four poles, six poles, ten poles or twelve poles, for example).

Although the embodiment has been described with reference to an example in which the plurality of second secondary conductors 32*b* of the cage unit 31 have a plate-like shape, the second secondary conductors 32*b* may have other shapes than the plate-like shape (a bar-like shape, for example).

Although the actual temperature of the permanent magnet unit 28 of the motor 2 is detected by the temperature sensor 15 in the embodiment, the temperature of the permanent magnet unit 28 may be estimated based on a travel history of the vehicle 1, a history of the alternating current supplied from the inverter 7 to the primary conductors 18 or the like.

Figure 7:
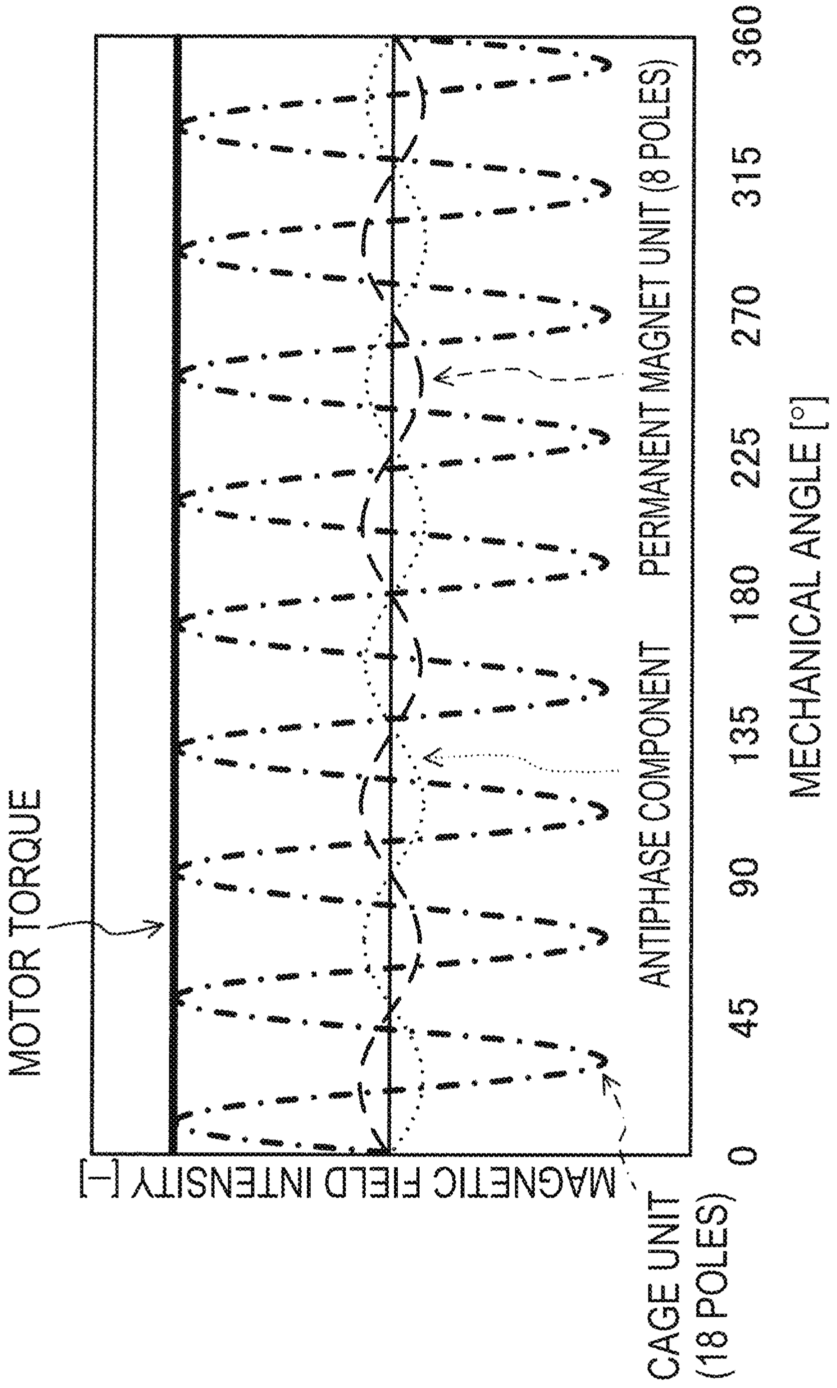
FIG. 7 is a diagram showing a variation corresponding to FIG. 6.

Although the motor torque pulsates in the asynchronous operation mode in this embodiment, the motor torque may be prevented from pulsating by producing a magnetic field that is antiphase with respect to the magnetic field of the permanent magnet unit 28 (see the dotted line in FIG. 7) to cancel the magnetic field of the permanent magnet unit 28. Note that the antiphase magnetic field is a magnetic field produced by the primary conductors 18 of the stator 17 and is produced by supplying, to the primary conductors 18, the current for driving the motor 2 that is superposed with a current that causes generation of a torque that is antiphase with respect to the pulsating component produced by the magnetic field of the permanent magnet unit 28. Alternatively, the pulsation of the motor torque may be reduced by producing an antiphase magnetic field in such a manner that the magnetic field of the permanent magnet unit 28 partially remains rather than being completely cancelled with the antiphase magnetic field. In this way, the pulsation of the motor torque can be eliminated (see the thick solid line in FIG. 7) or reduced in a situation where the driver or an occupant of the vehicle 1 does not want the pulsation of the motor torque (a case where the driver or an occupant is not used to a vehicle equipped with an engine, for example).

Although the inverter 7 makes the primary conductors 18 of the stator 17 produce a rotating magnetic field having eighteen poles in the asynchronous operation mode in this embodiment, a rotating magnetic field having other numbers of poles than eighteen (six poles, eight poles, twelve poles, fourteen poles or sixteen poles, for example) may be produced. When the motor torque is pulsated using the pulsating component produced by the magnetic field of the permanent magnet unit 28, the number of poles of the permanent magnet unit 28 may be different from the number of poles of the rotating magnetic field of the stator 17, that is, the number of poles of the cage unit 31.

Figure 8:
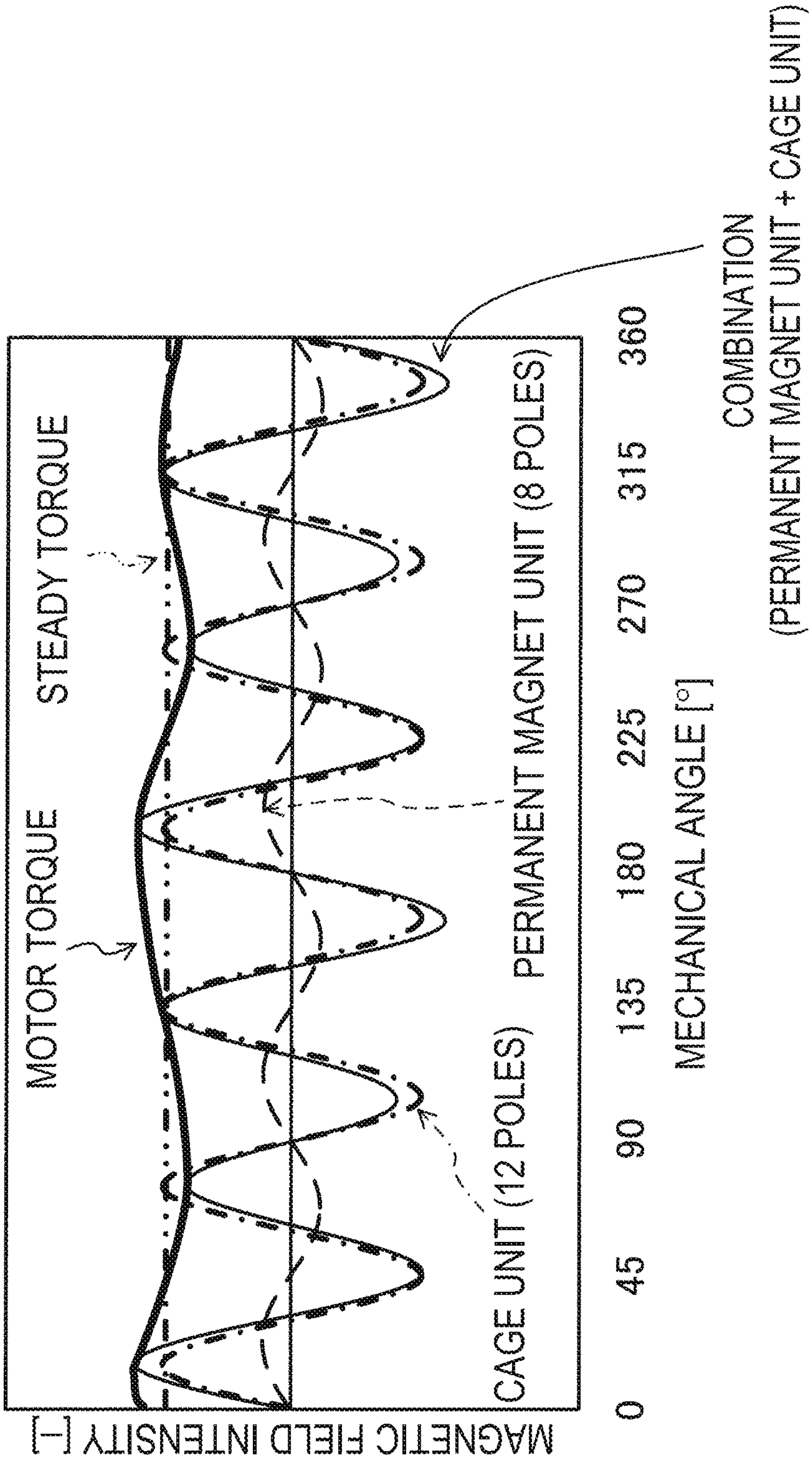
FIG. 8 is a diagram showing a variation corresponding to FIG. 6.

FIG. 8 shows an example of an asynchronous operation mode in which the number of poles of the rotating magnetic field is twelve. As shown in FIG. 8, twelve magnetic poles are formed in the cage unit 31, as with the rotating magnetic field. Since the number of poles (eight poles) of the magnetic field of the permanent magnet unit 28 does not agree with the number of poles (twelve poles) of the magnetic field of the cage unit 31, the cycle of the magnetic field intensity of the permanent magnet unit 28 with respect to the mechanical angle is different from the cycle of the magnetic field intensity of the cage unit 31. Therefore, a combined magnetic field of these magnetic fields shown by the solid line in FIG. 8 pulsates. Therefore, the motor torque generated by the combined magnetic field of the permanent magnet unit 28 and the cage unit 31 and the rotating magnetic field pulsates (see the thick solid line in FIG. 8). In the variation shown in FIG. 8, the cycle of the motor torque, that is, the frequency of the pulsation of the motor torque is less than in the embodiment shown in FIG. 6. Therefore, the frequency of the pulsation of the motor torque can be changed by changing the number of poles of the magnetic field of the cage unit 31 (the number of poles of the rotating magnetic field). Note that the magnitude of the pulsation of the motor torque or the magnitude and frequency of the pulsation of the motor torque can be changed by appropriately changing the number of poles of the cage unit 31 or, in other words, by appropriately changing the difference between the number of poles of the permanent magnet unit 28 and the number of poles of the cage unit 31.

Figure 9:
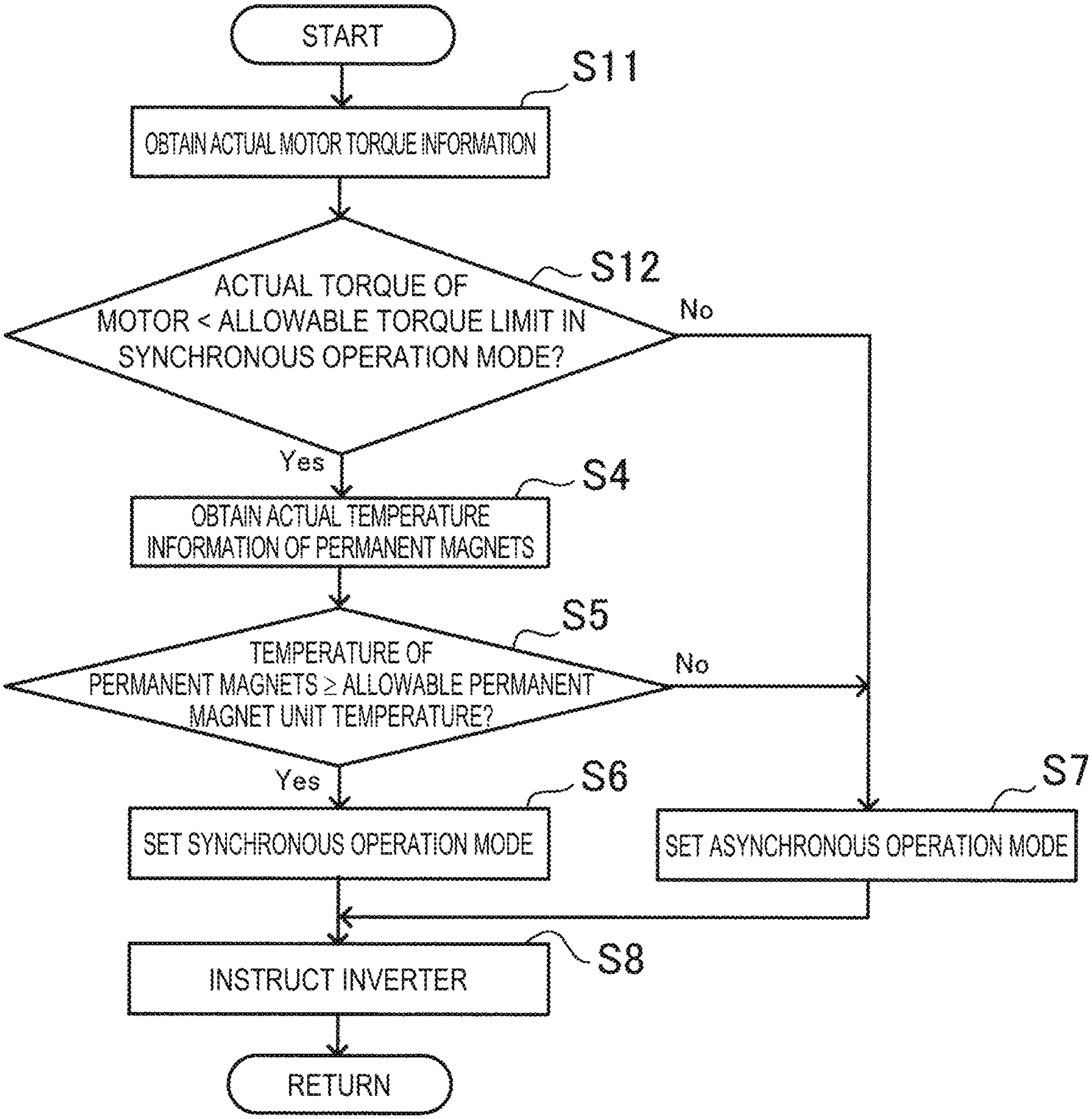
FIG. 9 is a diagram showing a variation corresponding to FIG. 4.

Although the operation mode of the motor 2 is set based on the target motor torque in this embodiment, the operation mode of the motor 2 may be controlled based on the actual motor torque as shown in a variation in FIG. 9. Note that in the variation shown in FIG. 9, Steps S1 to S3 in FIG. 4 are replaced with Steps S11 to S12.

In Step S11 in FIG. 9, the actual motor torque information of the motor 2 is obtained from the torque sensor 14. In Step S12, it is determined whether the actual motor torque information obtained in Step S11 is lower than the predetermined allowable torque limit in the synchronous operation mode. When the determination result in Step S12 is Yes, the process proceeds to Step S4, whereas when the determination result in Step S12 is No, the process proceeds to Step S7. Note that the processing in Steps S4 to S8 is the same as that in FIG. 4, descriptions thereof will be omitted.

Although the operation mode (synchronous operation mode or asynchronous operation mode) is set based on the target motor torque and the temperature of the permanent magnet unit 28 in this embodiment, the operation mode may be set based on any one of the target motor torque and the temperature of the permanent magnet unit 28. Furthermore, the operation mode of the motor 2 may be set based on the number of rotations of the motor 2 (which is obtained from the rotational angle sensor 16) instead of the target motor torque and the temperature of the permanent magnet unit 28 or in addition to the target motor torque and the temperature of the permanent magnet unit 28. For example, the asynchronous operation mode may be set when the number of rotations of the motor 2 is equal to or higher than a predetermined value, and the synchronous operation mode may be set when the number of rotations of the motor 2 is lower than the predetermined value. In this way, the asynchronous operation mode is implemented in a fast rotation range of the motor 2, so that the motor torque can be prevented from decreasing under the influence of the counter electromotive force of the permanent magnet unit 28 that increases in the fast rotation range in the fast rotation range of the motor 2. Furthermore, vehicle speed information obtained from the vehicle speed sensor 12 may be used instead of the number of rotations of the motor 2. In that case, for example, the asynchronous operation mode may be set when the vehicle speed of the vehicle 1 is equal to or higher than a predetermined value, and the synchronous operation mode may be set when the vehicle speed of the vehicle 1 is lower than the predetermined value.

Although the embodiment has been described with reference to an example in which the motor 2 drives only the front wheels FW, the front wheels FW and the rear wheels RW may be driven, only the rear wheels RW may be driven, or a plurality of motors 2 may be provided so that each front wheel FW and each rear wheel RW are separately driven.

Although an electric automobile has been described as an example of the vehicle 1 in the embodiment, the vehicle 1 can be any electric vehicle, such as a hybrid automobile equipped with the motor 2 and an engine.

Although a four-wheeled vehicle has been described as an example of the vehicle 1 in the embodiment, the vehicle 1 may be a three-wheeled vehicle or two-wheeled vehicle, or may be an agricultural vehicle (such as an agricultural tractor) as long as it can travel on land.

INDUSTRIAL APPLICABILITY

The present invention is suitable for a motor.

REFERENCE SIGNS LIST

1 vehicle
2 motor
17 stator
19 rotor
21 outer rotor part
22 inner rotor part
28 permanent magnet unit
29 permanent magnet
30 resin material
31 cage unit
**32*a*** first secondary conductor (secondary conductor)
**32*b*** second secondary conductor (other secondary conductor)
S housing space (housing part)
FW front wheel (driving wheel)

The invention claimed is:

1. A motor comprising:

a stator having a cylindrical shape;

a rotor having a cylindrical shape provided in the stator and is rotatable about a central axis of the stator, a driving wheel of a vehicle being driven by rotation of the rotor, wherein the rotor has a cage and a plurality of permanent magnets disposed side by side in a circumferential direction on an inner side of the cage, the cage includes a plurality of secondary conductors that extend in a radial direction, and the plurality of secondary conductors are interposed between inner parts of secondary conductors on opposite sides in the circumferential direction to form a magnetic barrier between adjacent permanent magnets.

2. The motor according to claim 1, wherein outer ends of the plurality of secondary conductors form an outer circumferential end part of the rotor.

3. The motor according to claim 2, wherein inner ends of the plurality of secondary conductors are located on a further inner side than inner ends of the plurality of permanent magnets.

4. The motor according to claim 2, wherein the cage further includes a plurality of other secondary conductors, the plurality of other secondary conductors are disposed side by side in the circumferential direction at circumferential positions corresponding to the plurality of permanent magnets on an outer side, and inner ends of the plurality of other secondary conductors are located on an outer side than inner ends of the plurality of secondary conductors.

5. The motor according to claim 4, wherein the plurality of other secondary conductors are housed in housing recesses formed in an outer circumferential surface of an outer rotor core of the rotor, and outer ends of the plurality of other secondary conductors are located at radial positions substantially coinciding with outer ends of the plurality of secondary conductors.

6. The motor according to claim 2, wherein the rotor is divided into an outer rotor part and an inner rotor part, the plurality of permanent magnets are housed in a housing part provided between the outer rotor part and the inner rotor part in the radial direction, and the housing part is filled with a resin material for coupling the outer rotor part, the inner rotor part and the plurality of permanent magnets to each other.

7. The motor according to claim 1, wherein inner ends of the plurality of secondary conductors are located on a further inner side than inner ends of the plurality of permanent magnets.

8. The motor according to claim 1, wherein the cage further includes a plurality of other secondary conductors, the plurality of other secondary conductors are disposed side by side in the circumferential direction at circumferential positions corresponding to the plurality of permanent magnets on an outer side, and inner ends of the plurality of other secondary conductors are located on an outer side than inner ends of the plurality of secondary conductors.

9. The motor according to claim 1, wherein the rotor is divided into an outer rotor part and an inner rotor part, the plurality of permanent magnets are housed in a housing part provided between the outer rotor part and the inner rotor part in the radial direction, and the housing part is filled with a resin material for coupling the outer rotor part, the inner rotor part and the plurality of permanent magnets to each other.

10. The motor according to claim 1, wherein each of the secondary conductors have a plate-like shape.

11. The motor according to claim 1, wherein the rotor is divided into an outer rotor part and an inner rotor part, and the inner rotor part has a polygonal shape when viewed in an axial direction.

12. The motor according to claim 1, wherein the plurality of permanent magnets are rare-earth magnets.

13. The motor according to claim 1, wherein each of the plurality of permanent magnets has a plate-like shape.

14. The motor according to claim 1, wherein a number of poles of the cage structure is larger than a number of poles of the permanent magnet assembly.

15. The motor according to claim 1, wherein the plurality of secondary conductors extend from a radial-direction inner side of the plurality of permanent magnets to an outer circumferential end part of the rotor.

16. The motor according to claim 1, further comprising control circuitry configured to switch an operation mode of the motor between a synchronous operation mode in which the rotor is rotated using a magnetic force of the plurality of permanent magnets and an asynchronous operation mode in which the rotor is rotated using an induced current of the cage, wherein the control device switches to the synchronous operation mode when a temperature of the plurality of permanent magnets is equal to or higher than a predetermined temperature threshold, and switches to the asynchronous operation mode when the temperature is below the predetermined temperature threshold.

17. The motor according to claim 1, wherein a cylindrical cover is wound around an outer circumferential surface of the rotor to prevent displacement of rotor components during rotation.

18. The motor according to claim 1, wherein an output shaft inserted in an inner rotor core of the rotor includes a cooling passage through which a cooling medium is supplied.

* * * * *